Patented Jan. 28, 1941

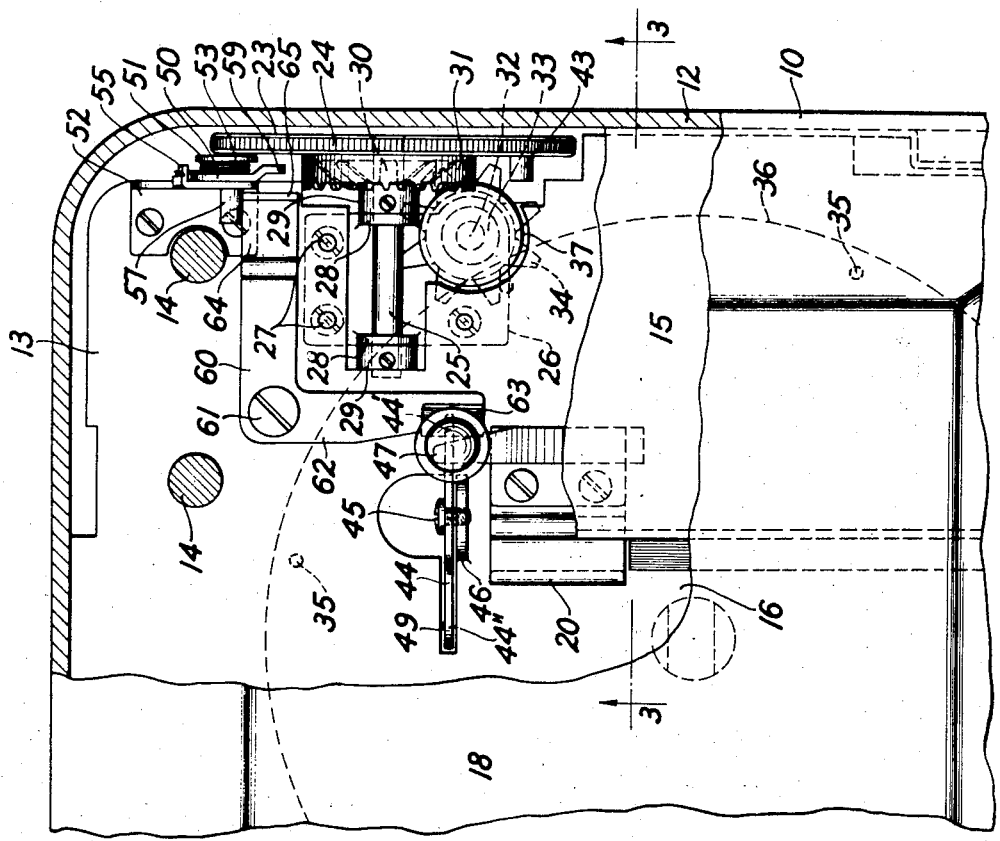

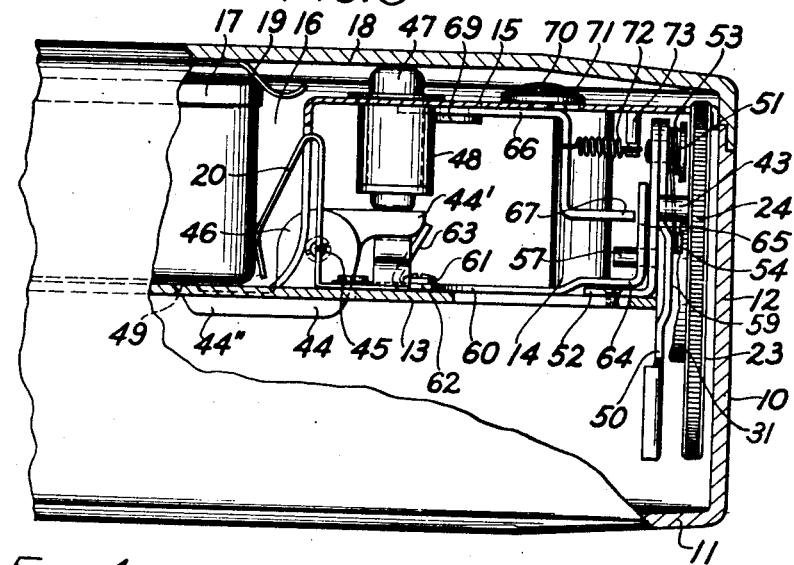
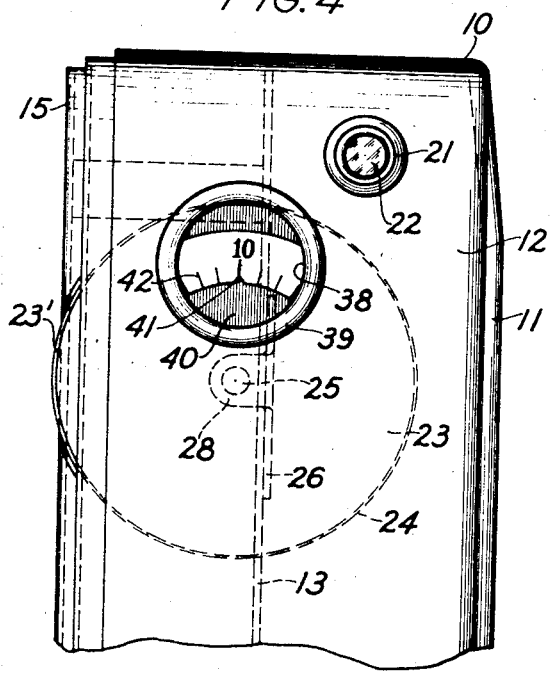
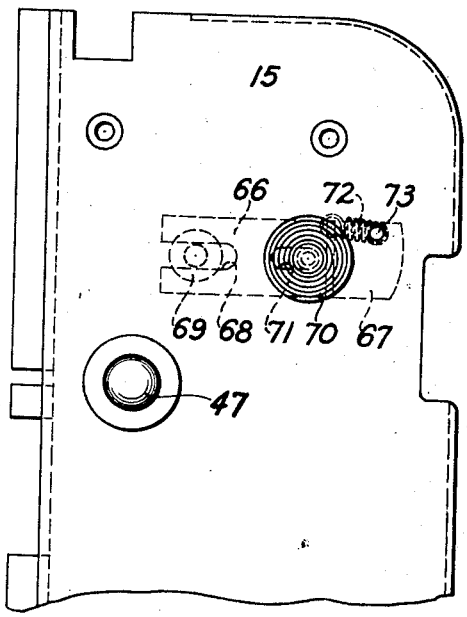

2,229,848

UNITED STATES PATENT OFFICE 2,229,848

INDICATOR FOR PHOTOGRAPHIC APPARATUS

Paul Härter and Georg Luckow, Stuttgart-Wangen, Germany, assignors to Eastman Kodak Company, Rochester, N. Y., a corporation of New Jersey Application March 28, 1940, Serial No. 326,450
In Germany March 11, 1939

4 Claims. (Cl. 95—31)

The present invention relates to an indicator for photographic apparatus and more particularly to an indicator which is moved into the finder field of said apparatus either upon ejection of the film holder or when the film footage indicator is moved to a predetermined position.

Film footage indicators which may be observed through the finder of the apparatus are known to the motion picture art. It is also known that ejectors may be used for film holders in the apparatus. However, thus far the combination of a footage indicator moved into the finder field either by an ejector or by a film footage indicator has not been proposed.

The primary object of the present invention is the provision of an indicating means movable into the view finder field of a photographic apparatus either by the film footage indicator or by the ejecting means for a film holder in the apparatus.

Another object of the invention is the provision of a manually releasable catch means for maintaining the indicating means in the finder field only after said indicating means has been moved into the finder field by the film holder ejector.

A further object of the invention is the provision of an indicating means comprising a lever arm having a colored translucent portion which is moved into the finder field either by the footage indicator or film holder ejector so as to advise the operator that an abnormal condition exists.

Other and further objects of the invention will be suggested to those skilled in the art by the following disclosure.

The above and other objects of the invention are embodied in a photographic apparatus comprising in combination, a casing providing a film compartment, a film footage indicator for showing the amount of film on a film holder in said compartment, a view finder having a field of view which is observed for use of said apparatus, an indicating means movable into the field of view of the finder by said footage indicator, and an ejecting means for displacing a film holder with respect to said film compartment and also for moving said indicating means into the finder field upon ejection of a film holder.

Reference is now made to the accompanying drawings wherein similar reference characters designate similar elements and wherein:

Fig. 1 is a rear elevation of a photographic apparatus equipped with the indicating means of the invention.

Fig. 2 is a side elevation in partial section of a photographic camera having an indicating means operated by an ejector or footage indicator.

Fig. 3 is a bottom view of the apparatus and a partial transverse section taken on the line 3—3 of Fig. 2.

Fig. 4 is a rear elevation of the camera casing with the cover open and showing the footage indicator available for manual movement.

Fig. 5 is a side elevation of the rear cover plate within the camera and particularly showing the manually releasable catch thereon.

While the invention is disclosed with respect to a magazine type of photographic apparatus, it is to be understood that the invention may also be used with any type of photographic apparatus having a footage indicator and in which an ejecting means is used for displacement of the film holder such as a film magazine or a film spool. In the illustrated embodiment of the invention, the camera casing 10 has a side wall 11 and a rear lateral wall 12. A mechanism plate 13 extends longitudinally through said casing 10 and carries posts 14 to which is fastened a rear cover plate 15. Said mechanism plate 13 and cover plate 15 form, together with other members not shown, a magazine chamber 16 adapted to receive a film magazine 17. A casing cover 18 engages the edges of casing 10 in light-tight relation, encloses said magazine chamber 16 and covers the rear cover plate 15. Said casing cover 18 is fastened in any suitable manner to the camera casing 10 and carries a spring 19 for resiliently engaging and positioning the film magazine 17 within compartment or chamber 16. A spring member 20 is mounted on mechanism plate 13 and engages a wall of the film magazine 17 to assist in locating the same within said chamber 16.

The camera casing 10 is provided in a well known manner with a view finder. Such view finder is preferably of the direct-view type and includes a rear sight member 21 mounted upon the rear lateral wall 12 of casing 10 and including a sight opening 22 through which the field of view of the finder may be observed.

A film footage indicator is also provided for the purpose of showing the amount of film on a film holder in the film compartment. Such film footage indicator is preferably of the gear driven type but may be of any of the types which are well known in the art. Specifically, the film footage indicator may comprise a disk 23 having a serrated periphery 24 and mounted upon one end of a shaft 25. An auxiliary plate 26 is fastened to mechanism plate 13 by screws 27 and has a pair of lugs 28 formed therefrom. Collars 29 on shaft 25 prevent axial movement thereof and a spider spring member 30 is inserted between one of said collars 29 and a crown gear 31 freely rotatable on shaft 25 and urged by spring member 30 into frictional engagement with the disk 23. An intermediate assembly comprises a transverse shaft 32 journaled in a bushing 33 on mechanism plate 13, includes a star wheel 34 attached to one end of shaft 32 and intermittently rotated by studs 35 on the casing of the spring motor 36, and includes a worm gear 37 on the other end of shaft 32 and meshing with the teeth of crown gear 31. A peripheral portion 23', see Fig. 4, of disk 23 extends beyond the edge of rear lateral wall 12 for manual operation of disk 23. However, casing cover 18 in its closed position covers said peripheral portion 23' so that disk 23 cannot be manually operated when the casing cover 18 is closed.

As a result of the film footage indicator just described, the operator is advised of the amount of film on a film holder in the film compartment such as the amount of film in magazine 17 within magazine chamber 16. Advancement of the film through the apparatus corresponds in a known manner with the rotation of the spring motor 36 so that for a given movement of the film through the apparatus or film holder therein one or more of the studs 35 engage and move a tooth of star wheel 34. Upon rotation of star wheel 34, shaft 32 and worm gear 37 are rotated. Rotation of the worm gear 37 also rotates crown gear 31 and disk 23 is rotated by virtue of the frictional connection between crown gear 31 and disk 23. On the other hand, such frictional connection permits manual movement or setting of the disk 23 when the casing cover 18 is open. The rear lateral wall 12 is provided with an opening 38 which is enclosed by a bezel 39 carrying a mask 40 having an index pointer 41. The rear surface of disk 23 is provided with a series of radial graduations 42 and corresponding footage numerals. Consequently, upon rotation of disk 23 the amount of film movement or the amount of film remaining in the film holder may be observed. The disk 23 carries on its rear surface a pin 43 which is located in definite relation to the graduations 42 and for a purpose to be later described.

It will be noted, see Figs. 1 and 4, that the rear sight member 21 and rear sight opening 22 of the view finder are near or adjacent to the opening 38 through which the footage indications are observed. Consequently, the operator may momentarily, during the operation of the apparatus, glance from the view finder to the footage indicator and determine the amount of film remaining in the apparatus or the amount of film that has been consumed in the particular picture sequence.

An ejector means for displacing a film holder with respect to the film compartment may comprise an ejector arm 44 pivoted by a screw 45 to a lug 46 on mechanism plate 13 and includes a plunger 47 mounted in a sleeve 48 on rear cover plate 15, said plunger 47 being preferably spring pressed upwardly to the position shown in Fig. 3 by a spring member which is not shown. It will be noted that plunger 47 of the ejecting means can only be operated when the casing cover 18 is open. When said plunger 47 is operated or pushed downwardly by the operator, one end 44' of the ejector arm 44 is also moved downwardly so that the other end 44'' of ejector arm 44 is moved through the slot 49 in mechanism plate 13 and the film magazine 17 is displaced with respect to the magazine chamber 16 and spring member 20. The ejecting means may be designed only to displace the magazine 17 with respect to the magazine chamber 16 so that it may be more readily removed by hand or may be designed completely to eject the film holder from the film compartment.

Since the attention of the operator of a photographic apparatus and particularly a motion picture camera is divided for observation of several different controls or indicators, the present invention is directed to giving a warning to the operator that an abnormal condition exists and should be corrected or remedied. To this end an indicating means is arranged for movement into the field of view of the view finder and is so moved to obstruct or obscure observation through the view finder when further operation of the apparatus can only result in failure. Such an indicating means can be provided in any of several ways, one of which is shown herein. A lever arm 50 is pivotally mounted at one end by a shouldered pin 51 to a bracket 52 attached to mechanism plate 13. A coil spring 53 encircles the shoulder of pin 51, has one end bearing upon a pin 54 upon lever arm 50, and has its other end hooked around an ear 55 of bracket 52. As a result, the lever arm is normally urged in a clockwise direction, see Fig. 1, or out of the field of the view finder. The free end of lever arm 50 carries a shutter or screen for preventing or obscuring observation of the finder field, preferably a colored translucent portion or sheet 56 is mounted on the free end of lever arm 50 for imparting a colored appearance, such as red, to the view observed through the finder. Movement of the lever arm 50 by the coil spring 53 or by other devices to be described is limited by means of a stud 57 on lever arm 50 and extending rearwardly through an arcuate slot 58 in bracket 52.

The lever arm 50 of the indicating means carries an off-set projection 59 which is located and arranged so as to be engaged by the pin 43 on the rear of footage disk 23. As before mentioned, pin 43 has a definite location with respect to the footage graduations 42 on the other side of disk 23 so that when the film footage indicator or disk 23 is moved to a predetermined position the indicating means is moved into the finder field. More specifically, when the "0" footage graduation is opposite the index pointer 41, the pin 43 engages off-set projection 59 to raise lever arm 50 and to place the colored transparent sheet 56 in the field of the view finder or in front of the rear sight opening 22 thereof. Thus the indicating means advises the operator that the film in the film holder is exhausted and such indicating means cannot be removed from the finder field until the casing cover 18 is opened and the footage disk 23 is manually reset.

In order to insure against operation of the apparatus without a film holder therein, an arrangement is provided whereby the indicating means is also moved into the finder field upon operation of the ejecting means for the film holder. For this purpose a motion transmitting means is interposed between the ejector and the indicating means and may comprise a bell crank 60 pivotally mounted on the mechanism plate 13 by a screw 61. One arm 62 of bell crank 60 carries an inclined portion 63 located to be engaged by a rounded corner on the end 44' of ejector arm 44. The other arm of bell crank 60 has an off-set portion 64 carrying a projection 65 which is adapted to engage the stud 57 on lever arm 50. Thus when plunger 47 is depressed for operation of ejector arm 44 and displacement of the film holder with respect to the film compartment, bell crank 60 is rotated in a counter-clockwise direction, see Fig. 2, by engagement of the end 44' of ejector arm 44 with inclined portion 63 and projection 65 is moved upwardly to engage stud 57 and move lever arm 50 so that its colored translucent sheet 56 is moved into the finder field or front of the rear sight opening 22 of the view finder.

Since the ejecting means may be released before a full film holder is placed in the apparatus, it is preferable to provide a catch means for holding the indicating means in the finder field only after it has been moved into such field by the ejecting means. Such a catch means comprises a latch bar 66 slidably mounted on rear cover plate 15 and having an off-set projection 67 adapted to engage the projection 65 of bell crank 60. The latch bar 66 is provided in one end with a slot 68 engaging a headed stud 69 on the under-surface of cover plate 15 and carries a finger-piece 70 having a stem which extends through a slot 71 in said cover plate 15. Said latch bar 66 and its off-set portion 67 are normally urged toward the projection 65 of bell crank 60 by a spring 72 attached at one end to latch bar 66 and attached at the other end to a pin 73 depending from rear cover plate 15.

Under normal conditions, see Fig. 3, the off-set projection 67 of latch bar 66 bears against the projection 65 of bell crank 60. Upon operation of the ejecting means and movement of the projection 65 against stud 57 to raise the colored translucent sheet 56 of lever arm 50 into the finder field, said projection 65 is moved beyond the off-set projection 67 whereupon the spring 72 moves off-set projection 67 beyond the edge of projection 65 to hold the lever arm 50 of the indicating means in raised position. Thus if the operator forgets to insert a refilled film holder, he will be advised of an abnormal condition as soon as observation through the view finder is made. This warning of an abnormal condition continues until the catch means is manually released by movement of the finger-piece 70 and off-set projection 67 away from the projection 65 to permit return of the lever arm 50 and bell crank 60 under the action of coil spring 53 to their normal positions.

It will now be understood that the indicating means or colored portion thereof may be moved into the finder field either when the film footage indicator is in a predetermined position or when the ejecting means is operated to displace a film holder with respect to the film compartment of the apparatus. If the indicating means has been moved into the finder field by the film footage indicator, it may be removed therefrom merely by resetting of the indicator or manual movement of disk 23. On the other hand, if the indicating means has been moved into the finder field by the ejecting means, the manually releasable catch means will not permit return of the indicating means to its normal position out of the finder field until the operator moves such catch means. By thus requiring this additional step, the operator is reminded that a new film holder should be placed in the film compartment.

Since the present invention is susceptible of many variations, the present disclosure is merely illustrative and the scope of the invention is defined in the appended claims.

Having now particularly described our invention what we desire to secure by Letters Patent of the United States and what we claim is:

1. In a photographic apparatus, the combination with a casing providing a film compartment, a film footage indicator for showing the amount of film on a film holder in said compartment, a view finder having a field of view which is observed for use of said apparatus, and an indicating means mounted for movement with respect to said view finder and moved into the field of view thereof by movement of said footage indicator to a predetermined position, of an ejector movable into an ejecting position to displace a film holder with respect to said film compartment, and a motion transmitting means operated by movement of said ejector to ejecting position and for moving said indicating means into the finder field.

2. In a photographic apparatus, the combination with a casing providing a film compartment, a film footage indicator for showing the amount of film on a film holder in said compartment, a view finder having a field of view which is observed for use of said apparatus, and an indicating means mounted for movement with respect to said view finder and moved into the field of view thereof by movement of said footage indicator to a predetermined position, of an ejector movable into an ejecting position to displace a film holder with respect to said film compartment, a motion transmitting means operated by movement of said ejector to ejecting position and for moving said indicating means into the finder field, and a manually operable catch means arranged on said casing normally to engage said motion transmitting means and to hold it with said indicating means in said finder field.

3. In a photographic apparatus, the combination with a casing providing a film chamber, a view finder on said casing and through which observations are made during operation of said apparatus, and an ejecting means on said casing for displacing a film holder with respect to said chamber, of an indicating means movable into said view finder by movement of said ejecting means for displacement of a film holder, and a manually operable catch means arranged on said casing normally to engage said ejecting means and to hold it with said indicating means in the finder field.

4. In a photographic apparatus of the magazine type, the combination with a casing providing a magazine chamber, a film footage indicator for showing the amount of film on a film holder in said chamber, an ejecting means on said casing and movable to displace a film holder with respect to said magazine chamber, and a view finder having a field of view which is observed for use of said apparatus, of a lever arm having a colored translucent portion, normally outside of said finder field and arranged to be moved thereinto individually by movement of said ejecting means for displacement of a film holder and by movement of said footage indicator to a predetermined position.

PAUL HÄRTER.
GEORG LUCKOW.